US008061488B2

(12) United States Patent  
Hofmann (10) Patent No.: US 8,061,488 B2  
(45) Date of Patent: Nov. 22, 2011

(54) CLAMPING OR BRAKING DEVICE (76) Inventor: Klaus Hofmann, Bruck (DE)

( * ) Notice: Subject to any disclaimer, the term of this patent is extended or adjusted under 35 U.S.C. 154(b) by 508 days.

(21) Appl. No.: 12/280,127

(22) PCT Filed: Feb. 19, 2007

(86) PCT No.: PCT/DE2007/000308

§ 371 (c)(1),
(2), (4) Date: Aug. 20, 2008

(87) PCT Pub. No.: WO2007/095909

PCT Pub. Date: Aug. 30, 2007

(65) Prior Publication Data

US 2009/0208272 A1 Aug. 20, 2009

(30) Foreign Application Priority Data

Feb. 21, 2006 (DE) .................. 10 2006 008 403

(51) Int. Cl.
*F16D 65/20* (2006.01)
(52) U.S. Cl. .................. 188/106 R; 188/72.4; 188/152
(58) Field of Classification Search .................. 188/67, 188/68, 71.1, 72.1–72.4, 153 R, 153 D, 153 A, 188/182–187, 106 R, 152
See application file for complete search history.

(56) References Cited

U.S. PATENT DOCUMENTS

| | | | | |
|---|---|---|---|---|
| 3,476,220 A * | 11/1969 | Kobayashi | ............... | 188/106 R |
| 3,576,236 A * | 4/1971 | Laverdant | ............... | 188/152 |
| 3,773,148 A * | 11/1973 | Jean-Claude et al. | ............... | 188/72.4 |
| 3,791,492 A * | 2/1974 | Neilsen | ............... | 188/170 |
| 4,412,603 A * | 11/1983 | Bischoff | ............... | 188/106 P |
| 5,024,298 A * | 6/1991 | Schenk et al. | ............... | 188/72.2 |
| 5,031,730 A * | 7/1991 | Marion | ............... | 188/180 |
| 5,174,585 A | 12/1992 | Erkki | | |
| 5,855,446 A | 1/1999 | Disborg | | |
| 6,629,584 B1 | 10/2003 | Muller | | |
| 7,416,262 B2 * | 8/2008 | Ring | ............... | 303/22.2 |
| 2005/0109569 A1* | 5/2005 | Sporzynski et al. | ..... | 188/218 XL |
| 2008/0179838 A1 | 7/2008 | Retzbach et al. | | |

FOREIGN PATENT DOCUMENTS

| | | | |
|---|---|---|---|
| AU | 432 719 B2 | 2/1973 | |
| DE | 28 695 | 7/1961 | |
| DE | 197 15 141 A1 | 10/1998 | |
| EP | 0936366 B1 | 11/2001 | |
| FR | 2 676 784 A1 | 11/1992 | |

* cited by examiner

*Primary Examiner* — Christopher Schwartz
(74) *Attorney, Agent, or Firm* — The Culbertson Group, P.C.

(57) ABSTRACT

A pneumatically actuatable clamping or braking device, has a housing with a space accommodating a hydraulic medium constructed least in part as a solid body. The space for accommodating the hydraulic medium is delimited on one side by a wall of the housing and on the other by a clamping or braking element. The device has at least one actuating element that acts on the hydraulic medium to produce a clamping or braking force which can be transmitted by the clamping or braking element to an impinging element. According to the invention, at least one actuating element is shaped like a pin or a spike. The actuating element is movable along a predetermined spatial curve, and acts on the hydraulic medium through an aperture in the wall of the housing delimiting the space for accommodating the hydraulic medium.

10 Claims, 11 Drawing Sheets

CLAMPING OR BRAKING DEVICE

FIELD OF THE INVENTION

The invention relates to a clamping or braking device, and more particularly a pneumatically actuable clamping or braking device.

BACKGROUND OF THE INVENTION

Clamping or braking devices of very diverse designs are used for very diverse applications. For example, European Publication No. EP-A-0936366 describes a braking device for a linear guide with a support body that is movable along a guide rail. The support body has brake shoes that act on the two long sides. The support body is constructed in an H-shape and has a thin, elastically flexible web and two lower legs with which it reaches around the guide rail. A brake shoe is arranged between each leg and the guide rail. The support body is furnished with two upper legs which, together with the web, form a holding space in which a force-generating means acting on the upper legs is provided. This can be a hydraulically or pneumatically actuatable knee lever mechanism or a piezo actuator. A hydraulically or pneumatically actuatable tapered slide valve that is guided, in a space formed for this purpose and tapering in the direction of the braking device, between the upper legs of the support body can also be provided as a force converter. In all cases, the elastic web bends due to the application of force to the two upper legs, so that the two lower jaws with the brake shoes are moved inwards and apply a greater force to the guide rail.

In this known braking device, used with an electromechanical converter such as a piezo element, the sensitivity of the latter to shocks or other mechanical stresses is particularly disadvantageous.

The use of a knee lever mechanism or a tapered slide valve implies a high assembly or manufacturing cost just like that for an electromechanical converter.

Additionally there is the need, particularly in the case of clamping devices, for relatively high clamping forces that can be achieved in known devices only with a relatively great construction effort and therefore high costs.

Another example design is found in U.S. Pat. No. 5,855, 446, which describes a hydraulic clamp bushing that is aligned with a shaft and can be connected to it in torque-proof fashion. The bushing has a substantially stable bushing body, which is arranged around a driveshaft a distance therefrom. A chamber which can be subjected to pressure is provided adjoining this bushing body and facing the shaft. A side wall of this chamber extending substantially parallel to the shaft simultaneously serves as a braking element, which is pressed against the shaft due to the expansion of the chamber when the chamber is acted upon by pressure in order thereby to produce a frictional connection. A Σ-shaped formation of the laterally adjoining walls of the chamber is intended to prevent the bushing from being oriented at a slant to the shaft when the chamber is acted upon by pressure. The Σ-shaped side walls of the chamber allow an expansion of the side walls radially toward the shaft in case pressure is applied, even before the increasing chamber pressure also presses the chamber wall running parallel to the shaft against the shaft. Thus, the bushing can orient itself perpendicular to the shaft axes before the rotationally fixed connection is produced.

This clamping device does not have a favorable force transmission for generating high pressing forces. Moreover, the chamber is limited in its shape and, in particular, in its possibilities for arrangement relative to the bushing body. Braking force can be achieved here only by application of positive pressure, and the actual braking element, which may have to transfer high drive forces, is not connected fixedly to the bushing body, but only via the necessarily relatively unstable pressure chamber.

Another known device is found in PCT Publication No. WO 01/34990 A1, which describes a clamping or braking device in which a chamber that can be subjected to pressure and is delimited in at least a partial area by at least one flexible tension-resistant or pressure-resistant wall, is provided on a base element. The boundary of the chamber opposite the wall can be designed like the first wall. It can also be a rigid part of a body, however. The walls are preferably a relatively slight distance apart. The forces resulting from the deformation of the chamber are directed at least in part in the direction of or along the wall, and are directed into the base element in the area of its connection to the wall. If one suitably selects the impingement point of such forces on the base element, and if this base element is at least partially deformable, then the forces can be transmitted via this base element to other parts of the base element, for example, into clamping or braking areas. A corresponding braking or clamping means in these areas can then be moved by means of the forces into an impingement position or out of the latter, in order to brake or release an element to be clamped or braked. Both applied positive and negative pressure in the chamber can be used here in order to introduce both tensile and compressive forces into the base element. Naturally, the clamping or braking areas can still be engaged with the guide element or the element to be clamped or braked before and after the force introduction, in which case however, changes of the impinging forces between the clamping or braking areas and the respective other element result.

This known clamping or braking device proceeds from the recognition that a suitable chamber seeks a deformation when acted upon by negative or positive pressure. If this chamber is formed to a large degree by at least one approximately flat wall, then positive or negative pressure in the chamber initially causes a deformation in a first direction that runs substantially perpendicular to this wall. In order to yield to the deformation (expansion or contraction) in this first direction, there is a corresponding contraction or expansion of the chamber in a second direction running generally perpendicular to the first direction (i.e., substantially parallel to the wall). This makes use of the fact that slight forces or deformations in the first direction produce large forces in the second direction, which can be used for braking or clamping, or for releasing pretensioned clamping or braking devices.

Finally, an expansion chuck device is known from PCT Publication No. WO 2005/044491 A1, which has a base element with a thin-walled expansion bushing provided on an axial end area of the base element and forming a central receptacle for a component to be clamped. Also provided is a clamping ring which surrounds the expansion chuck, forming an annular pressure chamber therebetween, and which is screwed to the base element. The pressure chamber is filled with a hydraulic means. The expansion bushing can be elastically deformed in order to fix a component in the receptacle. For this purpose, the clamping ring is displaced by rotation relative to the base element, reducing the volume of the pressure chamber. The hydraulic means in this expansion chuck is implemented as an elastic solid body. A sliding ring element is arranged between the elastic solid body and a pressure surface of the clamping ring in order to transmit an axial compressive force from the clamping ring to the solid body. By using the sliding ring, purely axial compressive forces are introduced onto the solid body, and their axial movement is decoupled from the rotational movement of the clamping ring.

This expansion chuck device, however, only allows the clamping of a rotationally symmetrical body by means of the annularly shaped solid body serving as a hydraulic means. What is needed, therefore, are clamping devices that allow flexible adaptation to a variety of clamping tasks.

SUMMARY OF THE INVENTION

The present invention provides a solution to the problem of creating a clamping or braking device having a solid body as the hydraulic means with the associated advantages, and allowing a flexible adaptation to very diverse clamping or braking tasks with a simple construction.

The invention may be applied to very diverse clamping or braking problems by using an actuation element shaped like a pin or spike, which can engage or penetrate at any desired position into the hydraulic medium implemented as a solid body.

Differently from the expansion chuck device according to WO 2005/044491 A1, it is not necessary to adapt an actuation element in the form of a sliding ring to a special geometry of the solid-body hydraulic means. Thus, identically constructed actuation elements can be used for realizing very diverse clamping or braking devices. This results in cost advantages both in adaptation developments and in warehousing for a related production.

According to one embodiment of the invention, the solid-body hydraulic medium is formed as an elastic solid body. Within the scope of the present description, a hydraulic medium formed as a solid body is basically understood to mean a solid body that is substantially incompressible under deformation and that, analogously to a hydraulic fluid, displays a substantially uniform pressure distribution inside the volume and on the surfaces delimiting the volume.

Such a solid body need not necessarily have elastic properties. Instead, incompressibility with a uniform pressure distribution can exist even in case of a purely plastic deformation. An elastic behavior, however, has the advantage that the solid-body hydraulic medium automatically withdraws back into the initial shape of the volume when changes of force that have led to a deformation of the volume are reversed. Such an elastic solid body can be, for instance, a suitable elastomer.

According to one embodiment of the invention, the impinging element that transfers the clamping or braking forces to another body can be formed integrally with the housing or detachably connected thereto, the impinging element having an elastically flexible area which is acted upon by the solid-body hydraulic medium. A change in volume of the solid-body hydraulic medium in any desired point thus leads to a corresponding change in volume of the elastically flexible area of the impinging element.

According to another embodiment of the invention, the impinging element can be constructed as a piston that is movably guided in the housing.

The solid-body hydraulic medium can be fixedly connected to the impinging element, by adhesive bonding or vulcanizing for example.

If an elastic solid-body hydraulic medium is used, there is the advantage, particularly in the case of an impinging element constructed as a piston, that the impinging element can be moved together with the solid-body hydraulic medium back into the starting position. The connection can be done by adhesive bonding or vulcanizing, for example, in the case of an elastomer.

According to a preferred embodiment of the invention, the hydraulic medium can be formed from a solid-body hydraulic medium that surrounds a secondary hydraulic medium consisting of a liquid, a paste or a solid body of low Shore hardness (the Shore hardness of which is less in any case than the Shore hardness of the solid-body hydraulic medium). This has the advantage that a displacement or shift of the material in the hydraulic medium by the movement of the actuating element can take place primarily in the secondary hydraulic medium. The secondary hydraulic medium in turn exerts pressure on the solid-body hydraulic medium or the impinging element, in which a lesser displacement or shifting of the material per volume unit is then required. In this way, the service life of the hydraulic medium overall is substantially improved.

A solid-body hydraulic medium formed in this manner can have an opening through which the actuating element is run in a sealed manner. In case the actuating element plunges into the hydraulic medium or the secondary hydraulic medium, the latter is pressed with a correspondingly higher pressure onto the actuating element, so that the sealing effect is guaranteed even at high pressures.

Instead of an opening, however, the solid-body hydraulic medium can also have a membrane area in the form of a sufficiently thin and flexible wall on which the actuating element exerts force, the membrane area being formed sufficiently elastically that the predetermined movement path of the actuating element is enabled. In this way, sealing problems in connection with the actuating element are generally avoided.

According to another embodiment, the solid-body hydraulic medium can have a wall area that delimits the area in which the secondary hydraulic medium is enclosed, and exerts pressure on the impinging element with its surface facing away from this area. It is possible in this manner to form the hydraulic element as a separate component, in particular, one detached from the impinging element.

According to another embodiment, the solid-body hydraulic medium can have an annularly closed wall area that delimits the area in which the secondary hydraulic medium is enclosed, the annularly closed wall area being connected at its end face to the impinging element.

According to one embodiment of the invention, the solid-body hydraulic medium can have a cylindrical shape or be formed in an annular shape. This yields a simple geometrical form, which allows a simple construction in conjunction with at least one actuating element shaped like a pin or a spike.

According to another embodiment of the invention, at least one actuating element can be formed as a pin which, viewed in the direction of movement of the pin for producing a pressure increase in the solid-body hydraulic medium, has a larger cross section in the posterior area than in the anterior area, the pin reaching completely through the solid-body hydraulic medium. This yields the advantage that a change in volume is produced by the differential cross section, which results from the difference in the cross-sectional areas of the anterior and posterior areas. The change in volume (assuming constant cross sections in the anterior and posterior areas) is equal to the differential cross-sectional area multiplied by the respective existing movement path.

In this way, the present invention achieves the advantage over a pure penetration of a spike into a solid-body hydraulic medium that only a relatively slight material movement of the solid-body hydraulic medium is produced, which has a positive effect on the durability of the material (number of repetition cycles).

The anterior end of a pin constructed in this manner can extend into a recess of the housing, which must have a sufficient depth (assuming a purely linear motion of the pin) that a motion path that generates the required volume change is possible.

According to another embodiment, a pin constructed in this manner can also project through the respective housing wall with its front end. In this way the motion path of the pin can be made visible. At the same time, wear on the solid-body hydraulic medium can made visible in this way, for example, if the end of the pin (in its initial or end position) projects farther and farther out of the housing with an increasing number of actuations of the clamping or braking device.

Not only wear phenomena on the solid-body hydraulic medium, but also wear phenomena on the impinging element can be made visible in this manner.

According to another embodiment of the invention, at least one actuating element can be constructed as a sleeve part, and an engagement part can also be provided that reaches partially or completely through the solid-body hydraulic medium and has a cross section that is formed substantially complementarily to the cross section of the interior of the sleeve part. In this manner, the sleeve part can be displaced substantially without play on the engagement part, wherein the sleeve part should remain connected with the engagement part during the entire possible movement path.

In this embodiment as well, the change in volume corresponds to the axial displacement path of the sleeve part multiplied by the cross-sectional area of the annular wall of the sleeve part.

In this embodiment, the engagement part can be fixedly or detachably connected to the impingement part or to a housing wall. The connection to the impingement part also allows the realization of a movement of the actuating element in the same direction in which the movement of the impinging element should also go. If the impinging element moves in a different direction, for example, perpendicular to the movement direction of the actuating element, then the engagement part can be connected to a housing wall.

According to one embodiment of the invention, the outer wall of the front part of the sleeve part, which comprises the engagement part, can be tapered, for example, it can have a beveled area.

To actuate at least one actuating element in order to cause a change in volume (in precise terms, a change in the shape of the volume) of the solid-body hydraulic element, a pneumatic or an actuating part can be provided, for instance.

By realizing a hydraulic principle by means of the solid body, the advantage of the hydraulic principle is preserved, according to which, in the case of an actuating element having a small effective cross-sectional area with which it acts on the solid-body hydraulic medium, a high pressure in the solid-body hydraulic medium can be produced with a small amount of force. This high pressure inside the solid-body hydraulic medium can be converted into a high clamping or braking force by using a relatively large surface area with which the impinging element is acted upon by the solid-body hydraulic medium.

Additional embodiments of the invention follow from the subordinate claims and the detailed description and drawings below. Preferred embodiments of the invention will be described in detail below with reference to embodiments illustrated in the drawings.

BRIEF DESCRIPTION OF THE DRAWINGS

FIG. 3b is a cross section through the embodiment in FIG. 3a.

FIG. 4b is a longitudinal section through the embodiment in FIG. 4a.

FIG. 5b is an axial section through the embodiment in FIG. 5a.

DETAILED DESCRIPTION OF PREFERRED EMBODIMENTS

Figure 1:
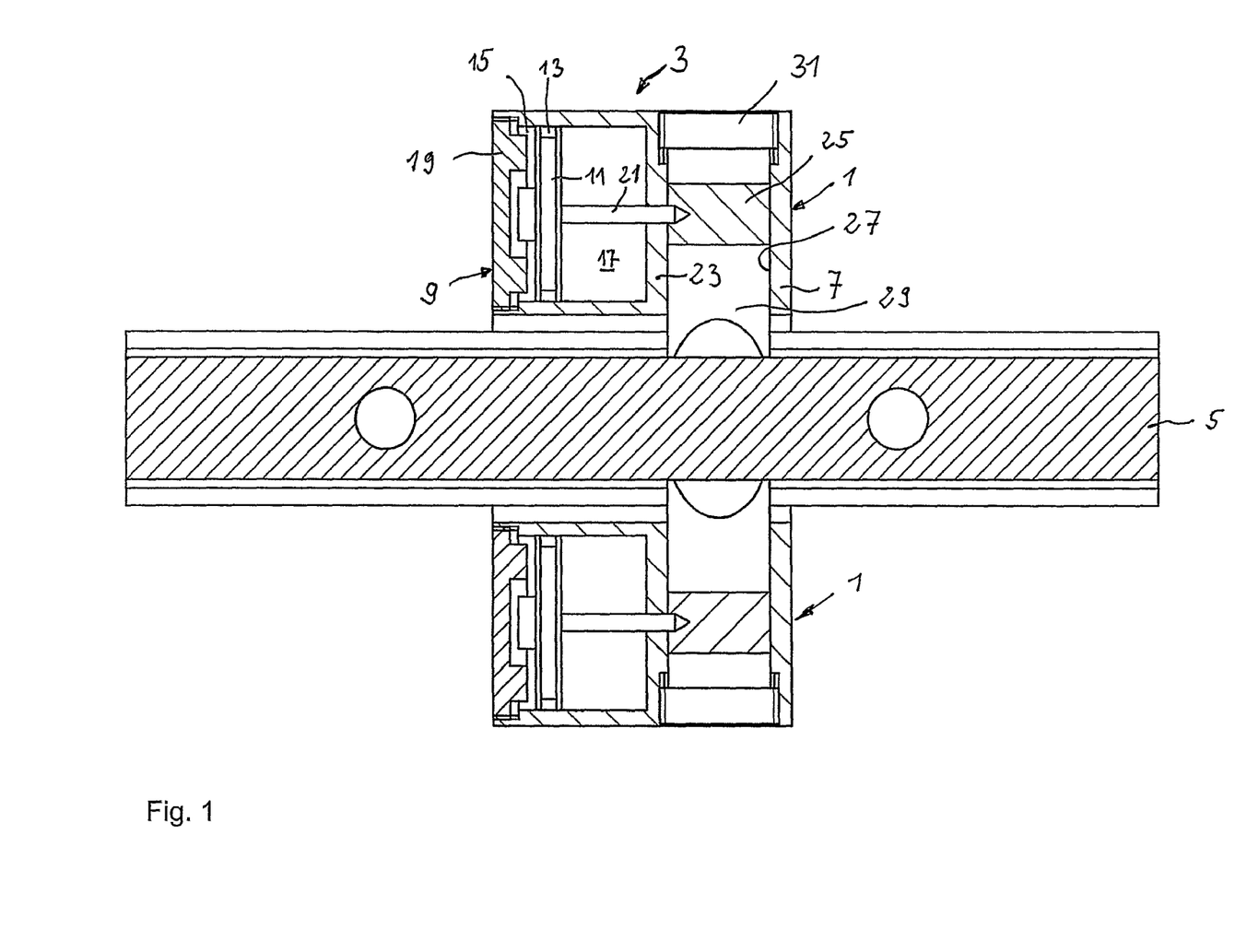
FIG. 1 shows a schematic longitudinal section through a first embodiment of a clamping or braking device with a spike-shaped actuating element, wherein the directions of motion of the actuating element and the impinging element are perpendicular to one another.

The clamping or braking device 1, represented in a schematic longitudinal section in FIG. 1, shows a carriage-like part 3 that is movably guided on a rail 5. Rolling bearings usually provided for this purpose are not shown for reasons of simplicity.

The actual clamping or braking device 1 is provided on carriage-like part 3. The former comprises a housing 7 in which a pneumatic cylinder 9 is provided. Pneumatic cylinder 9 comprises a piston 11, in the periphery of which a groove is formed in which a sealing element 13 is accommodated. Sealing element 13 seals off pressure space 15 from a pressure-free space 17 in case the back side of the piston is acted upon by compressed air, which can be supplied to the pressure space 15 of pneumatic cylinder 9, so that a pressure force directed to the right in FIG. 1 is exerted on piston 13. The value of the pressure force results from the impingement surface area of the back side of piston 13 multiplied by the pressure of the compressed air supplied to pressure space 15. Pressure space 15, or the entire pneumatic cylinder 9, is closed off at its back end (at the left in FIG. 1) by means of a cover 19 that can be screwed tightly into a corresponding threaded hole of housing 7. For reasons of clarity, the corresponding supply lines for the compressed air are not shown.

A spike-shaped actuating element 21 movable together with piston 11, or which absorbs the pressure force generated by piston 11, is provided at the side of piston 11 facing away from the side acted upon by compressed air. The front end of actuating element 21 projects through a wall 23 that delimits the pneumatic cylinder into a hydraulic medium 25 formed from a solid body. The solid-body hydraulic medium has a cylindrical shape and is held in a corresponding cylindrical recess 27 in housing 7. An impinging element in the form of a piston 29 is movably held in cylindrical recess 27 of housing 7. Piston 29 can in the initial state already rest with its front end on rail 5. However, a slight gap between the front side of piston 29 and rail 5 can also be present in the initial state. The rear end face of piston 29 can be connected to solid-body hydraulic medium 25, for example by adhesive bonding or vulcanizing.

Cylindrical recess 27 is closed off by means of a closure element 31, which can be screwed into the upper area of cylindrical recess 27. The closure element impinges on solid-body hydraulic medium 25 with its end face that is turned toward the interior.

If, starting from a pressure-free state of pneumatic cylinder 9, its pressure space 15 is acted upon by compressed air, then spike-shaped actuating element 21 is pressed with its tip (further) into solid-body hydraulic medium 25. In this way, a change in shape of the volume of solid-body hydraulic medium 25 is produced. Since solid-body hydraulic medium 25 can expand only in the direction of motion of piston 29, piston 29 is initially moved in the direction toward rail 5 if the piston is not already resting against rail 5 in the initial state. If the penetration of the actuating element into the hydraulic element causes a volume displacement that is greater than the change in volume necessary to push piston 29 at a certain distance between its front side and rail into a position in which piston 29 rests against rail 5, then there is an increase of pressure inside solid-body hydraulic medium 25. The final pressure is dependent on the force with which piston 13 presses actuating element 21 into solid-body hydraulic medium 25. The cross-sectional area of the actuating element in its actuation direction is crucial in this regard.

According to the laws of hydrostatics, piston 29 is pressed against rail 5 with a compressive force that results from the pressure generated in solid-body hydraulic medium 25 and the cross-sectional area of piston 29. Here as well, the effective cross-sectional area of the piston perpendicular to its direction of motion that is acted upon by solid-body hydraulic medium 25 is crucial.

Since the cross-sectional area of actuating element 21 is small with respect to the cross-sectional area of piston 29, an impinging force for piston 29 results from the product of the application force for impinging element 21 and the ratio of the cross-sectional area of piston 29 to the cross-sectional area of actuating element 21.

In this manner, carriage-like part 3, which as shown in FIG. 1 has an identical clamping or braking device 1 on each side, can be clamped onto or released from rail 5, or braked with respect to its motion.

Figure 2:
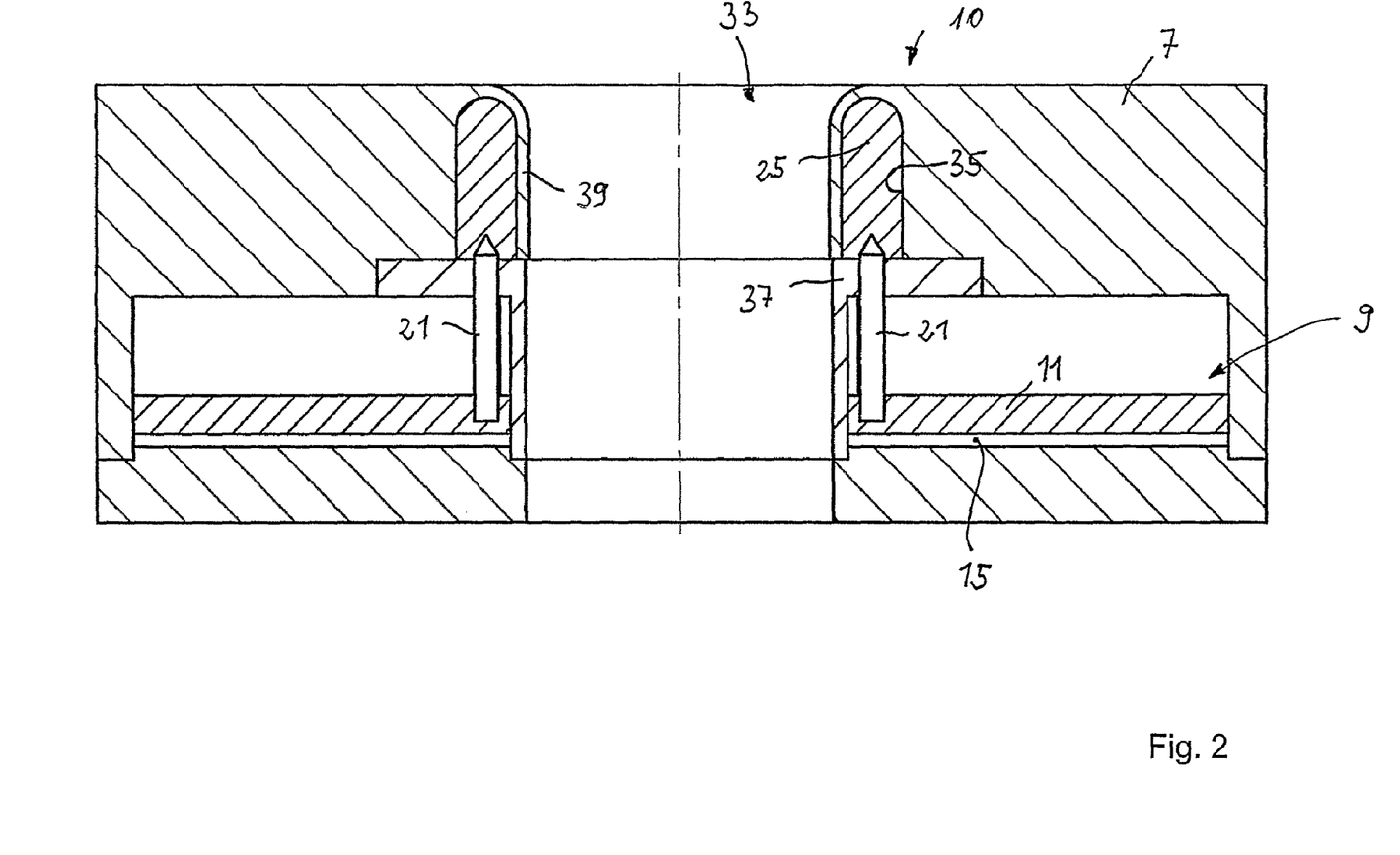
FIG. 2 is a second embodiment of a clamping or braking device with an annular solid-body hydraulic medium.

FIG. 2 shows a schematic cross section through an additional embodiment of a clamping or braking device 10 that is suitable for clamping a rotationally symmetrical part, for instance a shaft. Housing 7 in this case has a receiving opening 33 in which an element to be clamped, such as a shaft, can be accommodated. Also provided in housing 7 is an annular recess 35 in which an annularly formed hydraulic element 25 is accommodated. Annular recess 35 is closed off by means of a flange-like part 37, with the wall running in the axial direction of part 37 delimiting the receiving opening 33. An annularly formed pneumatic cylinder 9 is also provided in housing 7. It comprises an annular piston 11, on the rear side of which a pressure space 15 is formed. The supply lines and supply openings for the pneumatic medium are not shown in FIG. 2 for reasons of simplicity. Several spike-shaped actuating elements 21, each projecting through a matching hole in the wall running perpendicular to the axis of the device as a whole and impinging with its front end on solid-body hydraulic medium 25, or projecting into it, are connected to piston 11.

In the embodiment of a clamping or braking device 10 illustrated in FIG. 2, the inside wall 39 of housing 7 delimiting the annular recess 35 for accommodating solid-body hydraulic medium 25 forms an impinging element for clamping or braking the rotationally symmetrical element, not shown, which can be inserted into receiving opening 33.

If pressure space 15 is acted upon by compressed air in the clamping or braking device 10 illustrated in FIG. 2, then annular piston 11 is moved together with the spike-shaped actuating elements 21 in the direction toward solid-body hydraulic medium 25, insofar as inside wall 39 is not already resting against the element to be clamped in the initial state. If a gap is present between the element to be clamped and inside wall 39 in the initial state, then actuating elements 21 are pressed sufficiently far into solid body hydraulic medium 25 until the thereby induced change in shape of the volume of solid-body hydraulic medium 25 brings about contact of inside wall 39 against the outer surface of the element to be clamped. Subsequently, there is an increase of the pressure in solid-body hydraulic medium 25 corresponding to the compressive force generated by means of the pneumatic cylinder 9, which is distributed onto the individual actuating elements 21. The element to be clamped is thus retained by a pressure force acting on its peripheral surface that results from the product of the surface area of wall 39 contacting the element to be clamped and the effective pressure in solid-body hydraulic medium 25.

The additional embodiment illustrated in FIGS. 3a and 3b again relates to the braking or clamping of a carriage-like part 3 guided on a rail 5. A clamping or braking device 20, which again comprises a pneumatic cylinder 9 with a piston 11, is provided in the carriage-like part 3 illustrated in FIGS. 3a and 3b. Pneumatic cylinder 9 is closed off by a cover 19 which closes off a corresponding hole in housing 7. As is visible from FIGS. 3a and 3b, cover 19 can be screwed together with housing 7. Cover 7 has a threaded hole 19a into which a connection line for the supply of compressed air can be screwed.

Figure 3A:
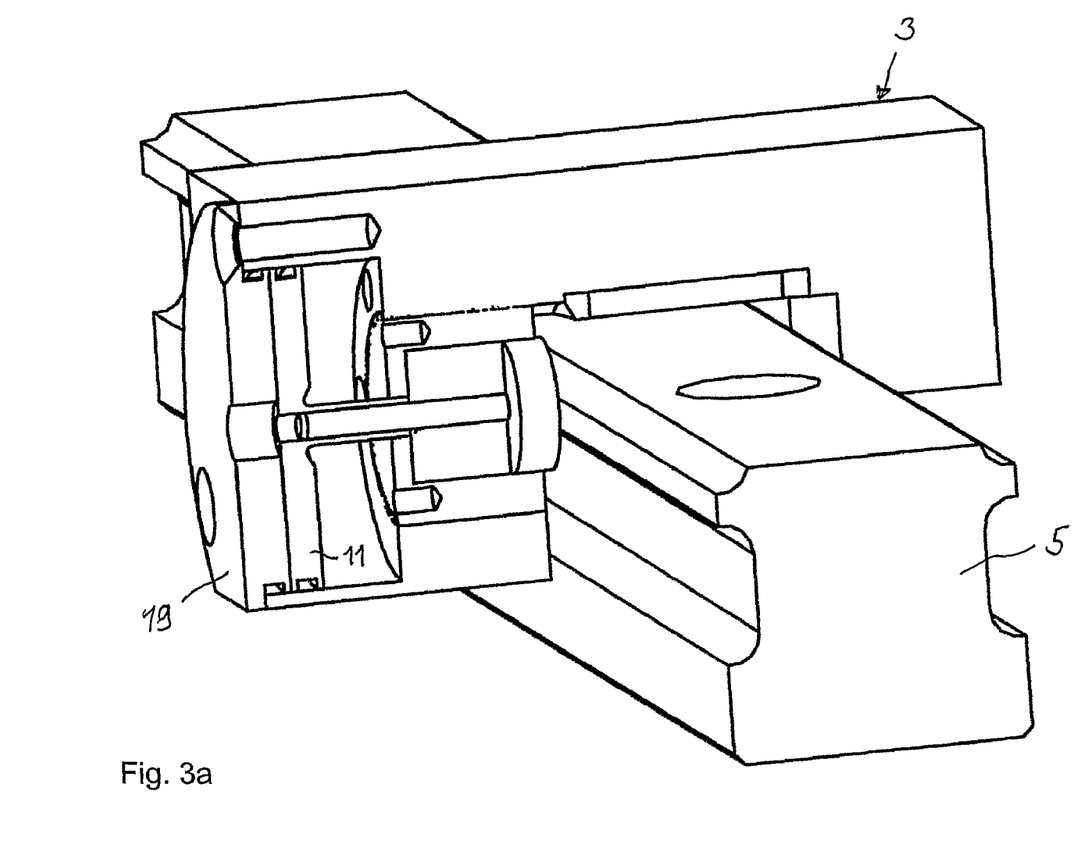
FIG. 3a is a schematic perspective view of a third embodiment of a clamping or braking device with a sleeve-like actuating element.
Figure 3B:
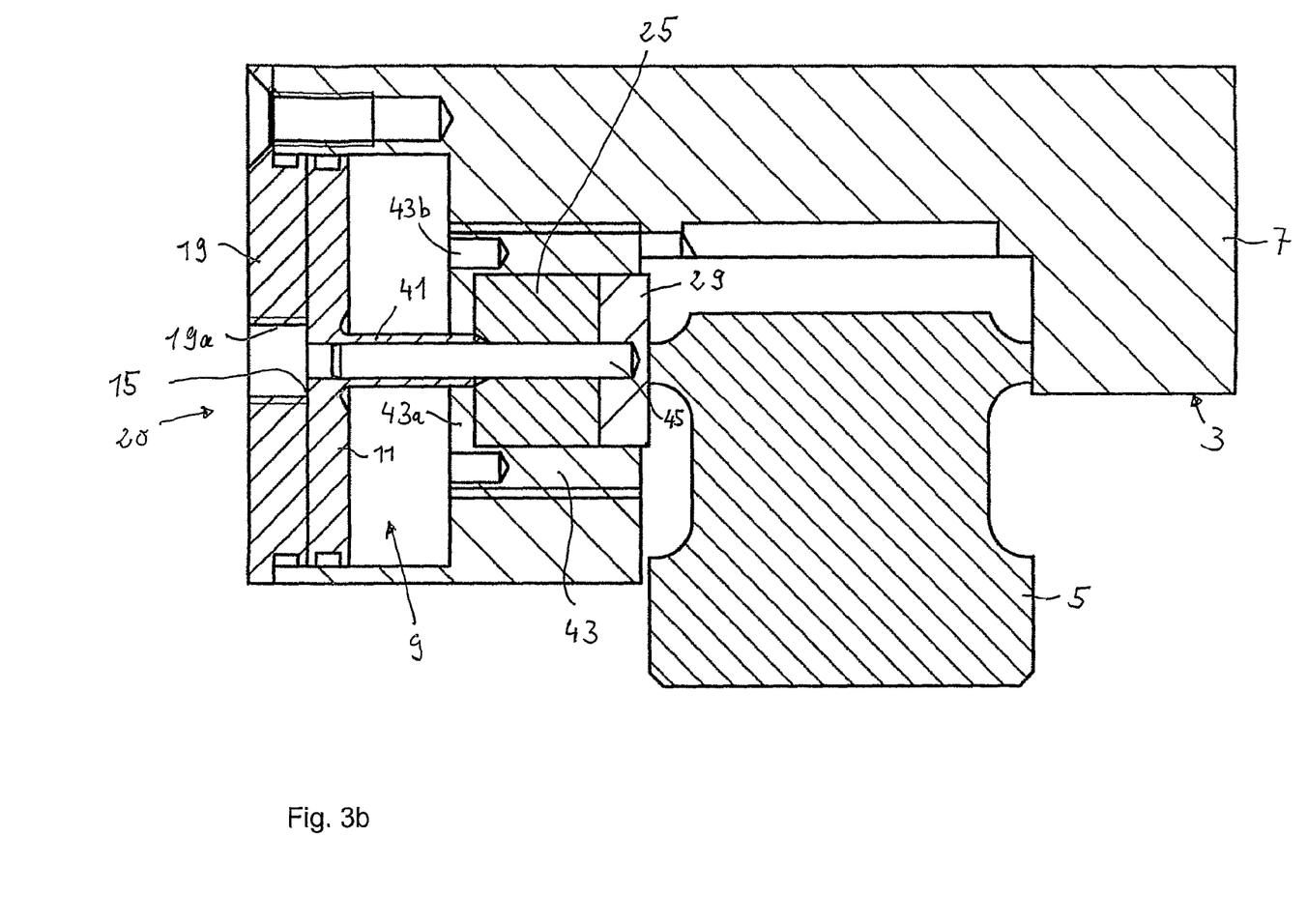

On the side of piston 11 facing away from pressure space 15 or threaded hole 19a, a sleeve-like actuating element 41 is provided that has an axis parallel to the direction of motion of piston 11. Actuating element 41 reaches through the bottom wall 43a of a pot-like receiving element 43 in which a solid-body hydraulic medium 25 is accommodated. The accommodation space of pot-like receiving element 43 for solid-body hydraulic medium 25 is delimited on its open side by an impinging element in the form of a piston 29. Piston 29 is connected to a pin-shaped engagement part 45 which reaches through solid-body hydraulic medium 25 and engages with sleeve-like actuating element 41. The geometry of engagement part 45 and the geometry of the sleeve-like actuating element are matched to one another such that actuating element 41 is guided substantially free of play on engagement part 45. In this way, tilting during the displacement movement is avoided on the one hand, and on the other hand the solid-body hydraulic medium is prevented from being pressed into an excessively large gap between the inside wall of sleeve-like actuating element 41 and the outer wall of the engagement part 45 engaging with it.

If piston 11 of pneumatic cylinder 9 in clamping or braking device 20 illustrated in FIGS. 3a and 3b is acted upon by compressed air, then actuating element 41, which is movably guided on engagement part 45, is pressed out of its initial position (further) into solid-body hydraulic medium 25.

As previously explained in connection with the embodiments according to FIGS. 1 and 2, this results first in a closure of any gap existing between the front side of piston 29 acting as an impinging element and the corresponding contact surface of rail 5, and then in an increase of pressure in solid-body hydraulic medium 25. In the embodiment illustrated in FIGS. 3a and 3b, the pressure increase is dependent on the annular cross-sectional area of sleeve-like actuating element 41 and the force acting thereon which is generated by pneumatic cylinder 9. The force exerted on rail 5 by means of the impinging element or piston 29 results in turn from the surface area of piston 29 acted upon by solid-body hydraulic medium 25 and the pressure prevailing in the solid-body hydraulic medium. As already described above, there is a transmission ratio of the force exerted by means of actuating element 41 on solid-body hydraulic medium 25 that corresponds to the ratio between the surface area of piston 29 acted upon by solid-body hydraulic medium 25 and the effective active annular cross-sectional area of actuating element 41.

As is visible from FIG. 3b, pot-like receiving element 43 serves to adjust a gap between piston 29 and rail 5, or for the exact positioning of piston 29 in its initial position with respect to rail 5. For this purpose, the pot-like element can be screwed by means of a threaded hole into housing 7 and adjusted in this manner. Holes 43b in the rear end face of pot-like receiving element 43, into which a corresponding tool with projections for rotating the element 43 can reach, serve for adjustment.

In this embodiment, just as in all other embodiments, an initial tension between the impinging element and the element to be clamped can naturally be adjusted already in the initial state, i.e., in the unpressurized state of the pneumatic cylinder, or in the initial position of actuating element 41 or 21. For this purpose, the initial position of the actuating element should be fixed by a stop.

The clamping or braking device 20 with a sleeve-like actuating element in the embodiment according to FIGS. 3a and 3b has the advantage that, due to the small diameter change in the pressing of actuating element 41 into solid-body hydraulic medium 25, only a slight shift of material, or only small movements of differentially small material volumes of hydraulic element 25 are necessary. The material of solid-body hydraulic medium 25 is thus subject to smaller stresses, which leads to an improved durability and service life of the material.

Figure 4A:
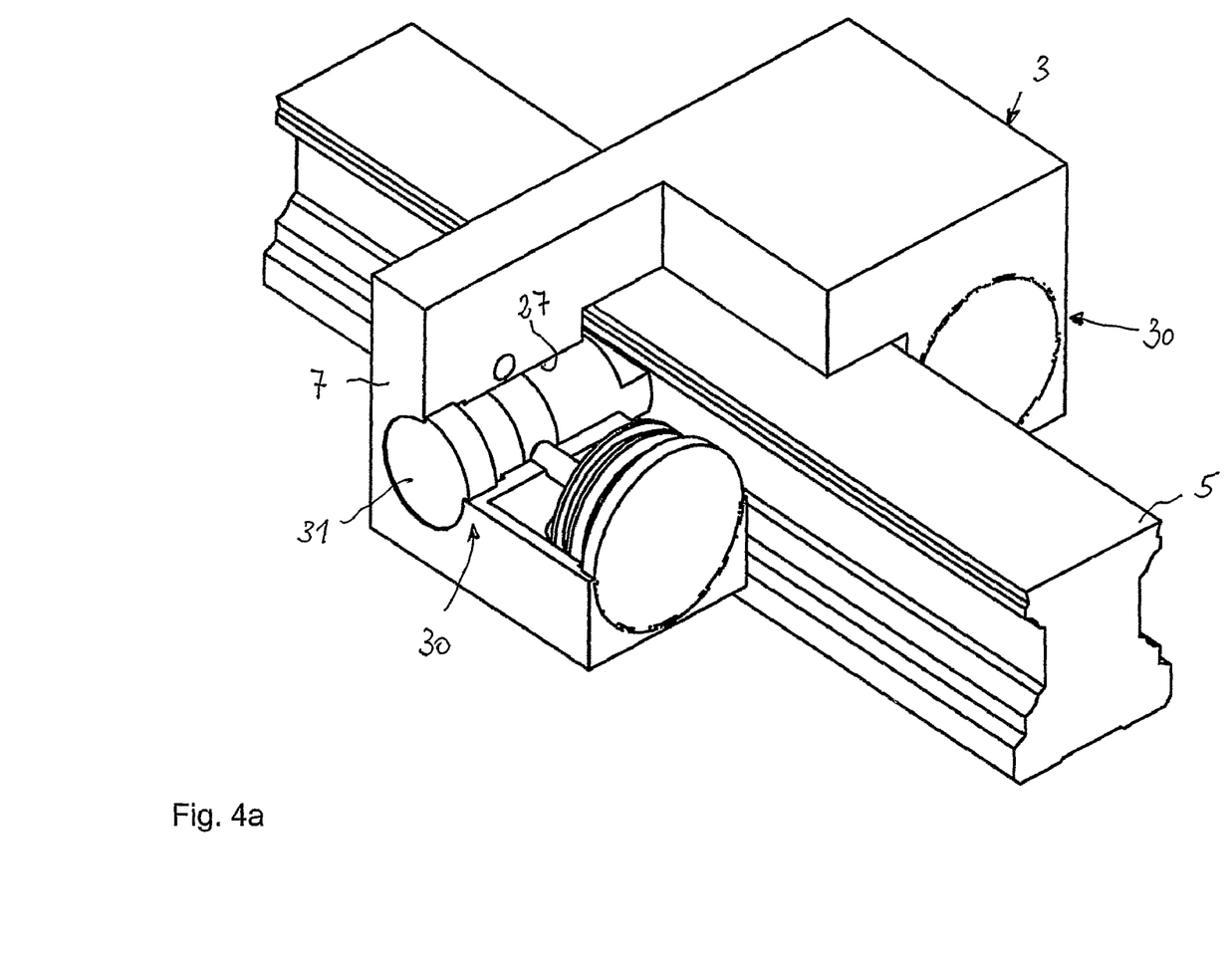
FIG. 4a is a schematic representation of a clamping or braking device with pin-shaped actuating element that reaches completely through the solid-body hydraulic medium.
Figure 4B:
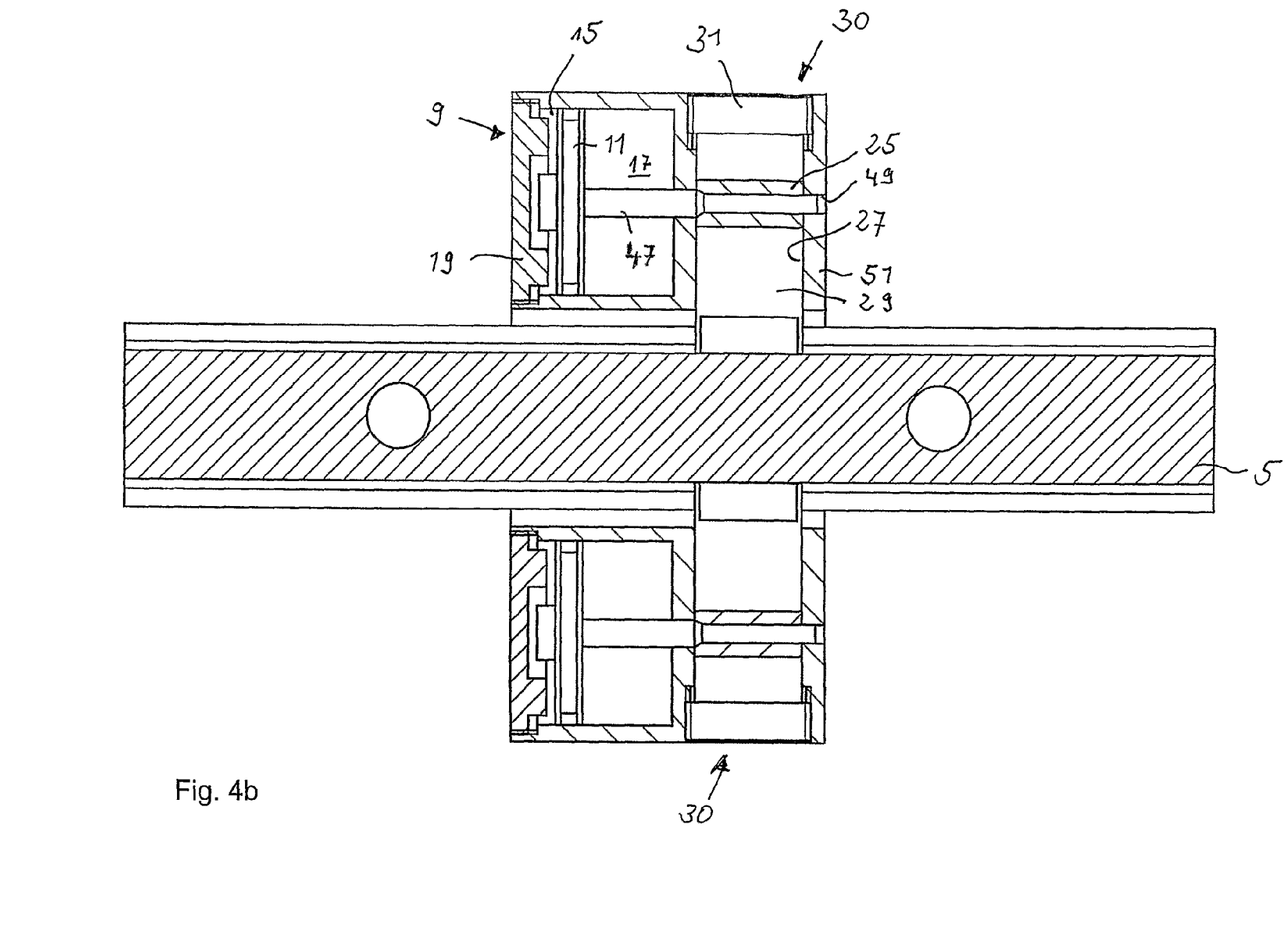

FIGS. 4a and 4b also shows a carriage-like part 3 that is movably guided on a rail 5. The clamping or braking device 30 integrated into carriage-like part 3 differs from the embodiment illustrated in FIGS. 3a and 3b in that the directions of motion of the actuating element and the impinging element are perpendicular to one another. The principle of clamping or braking device 30 according to FIGS. 4a and 4b thus largely corresponds to the embodiment according to FIG. 1. One can therefore largely refer to the explanations above in connection with the embodiment according to FIG. 1.

Differently from the embodiment of clamping or braking device 1 according to FIG. 1, clamping or braking device 30 according to FIGS. 4a and 4b has a pin-shaped actuating element 47 that has a larger diameter or larger cross section in its posterior area than in its anterior area, the pin-shaped actuating element passing completely through solid-body hydraulic medium 25 and projecting with its front end into an opening in housing wall 51. The functioning of clamping or braking device 30 in regard to bringing about a change in the shape of the volume of solid-body hydraulic medium 25 is comparable to the respective functioning of the embodiment of a clamping or braking device 20 according to FIGS. 3a and 3b. Here as well, broadening of an opening in solid-body hydraulic medium 25 is achieved by the insertion of an area with larger diameter or larger cross-sectional area. Instead of an actuating element 41 telescopically comprising an engagement part, a one piece pin-shaped actuating element 47 with an appropriate change in cross section is used in the embodiment according to FIGS. 4a and 4b.

The exertion of a force, due to the change in shape of the volume of solid-body hydraulic medium 25, on a piston 29, which serves as an impinging element, is again identical to the respective functioning of the embodiment according to FIG. 1.

Since actuating element 47 in the embodiment of a clamping or braking device 30 according to FIGS. 4a and 4b projects through opening 49 in housing wall 51, this can serve as a recognition sign as to whether the system is in the initial position or the clamped position. In the initial position illustrated in FIG. 4b, the front end of actuating element 47 does not yet project past wall 51. If piston 11 of pneumatic cylinder 9 is moved together with actuating element 47 into the clamping position, in which the actuating element plunges further into solid-body hydraulic medium 25, then the front end of actuating element 47 projects past wall 51, whereby the clamping or braking position of device 30 is visually displayed.

Figure 5A:
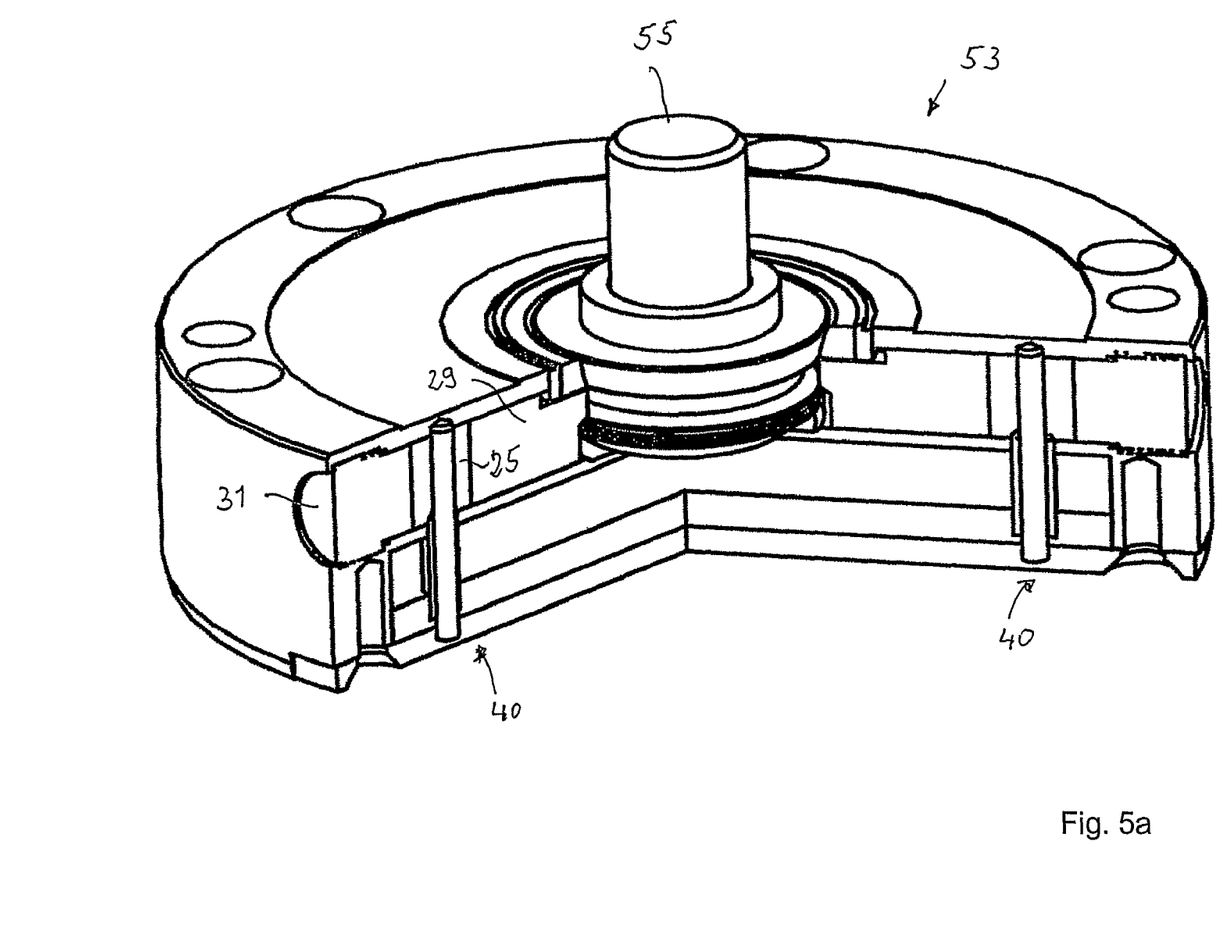
FIG. 5a is a perspective view of a chuck mechanism with three clamping or braking devices.
Figure 5B:
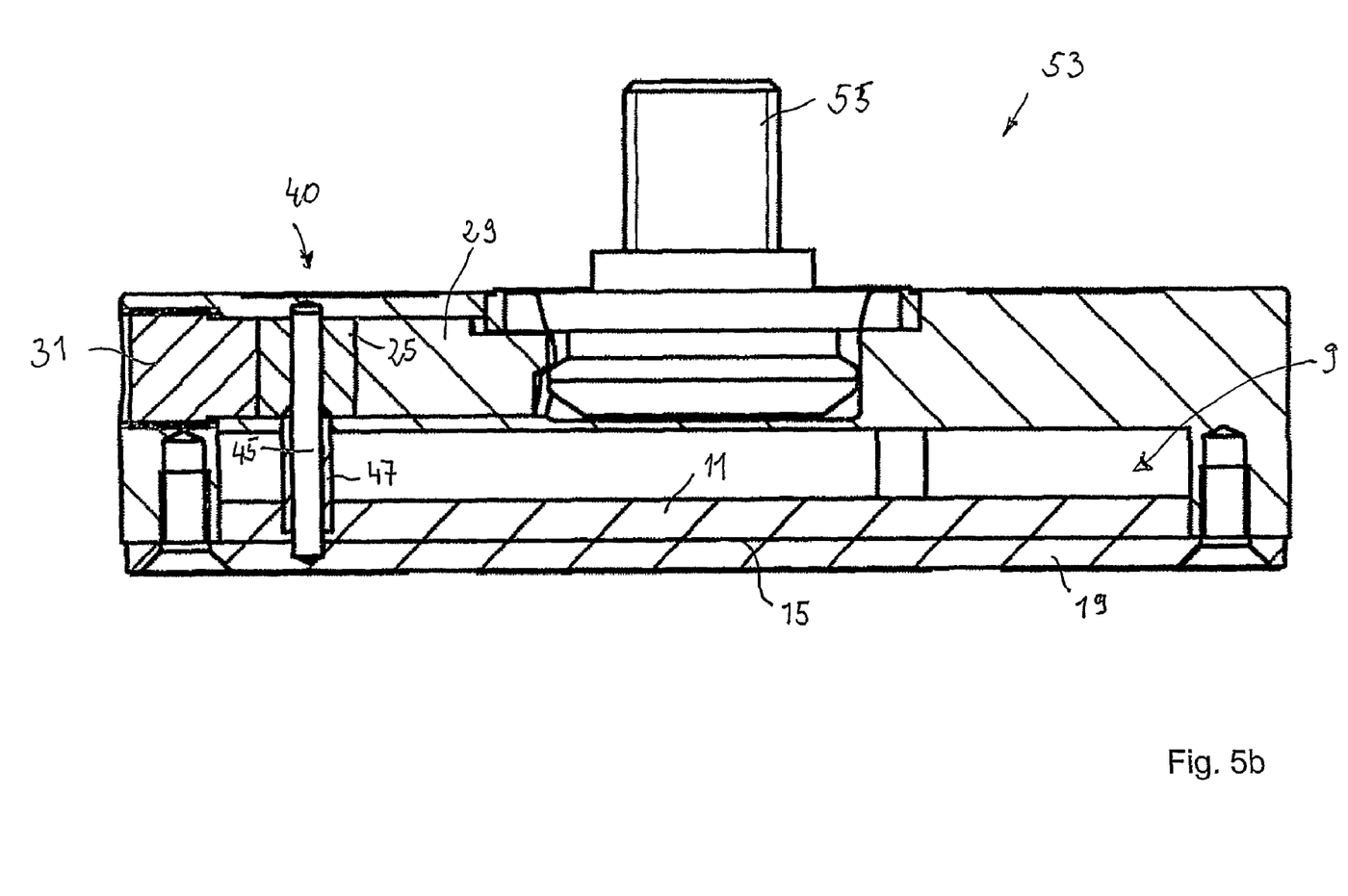

FIGS. 5a and 5b shows a zero chuck system 53 with which a receiving element 55 can be fixed and clamped in an exactly defined position. As is visible from the perspective, partially cutaway view according to FIG. 5a, zero chuck system 53 has three clamping or braking systems 40 for this purpose, each offset from the other by an angular distance of 120°. The clamping or braking devices 40 according to FIGS. 5a and 5b are constructed similarly to the clamping or braking devices 30 according to FIGS. 4a and 4b. Here too, the principle of a sleeve-like actuating element 47 is used, encompassing a pin-shaped engagement part 45. Solid-body hydraulic medium 25, a displaceable piston 29 and a closing cover 31 are provided in the same manner as in the embodiment according to FIGS. 4a and 4b in a respective rotationally symmetrical receiving element 25. A pneumatic cylinder 9 is integrated on the underside of zero chuck system 53. It comprises a piston 11 which rests in its initial position against a cover 19 of pneumatic cylinder 9. A pressure space 15 is formed between the back side of piston 11 and the inner wall of cover 19. For reasons of simplicity, supply lines for supplying compressed air are again not shown. Piston 11 is connected to sleeve-like actuating elements 47 for clamping or braking devices 40. Pin-shaped engagement elements 45, each projecting through solid-body hydraulic medium 25 and tightly fixed between an upper wall (FIG. 5b) and cover 19, are further provided.

In this manner, by an application of pressure to pressure space 15 via piston 11 of pneumatic cylinder 9, a movement of all three actuating elements 47 and the exertion of a force for producing a pressure increase in the respective medium 25 can also be achieved. Due to the changing shape of the volume of each solid-body hydraulic medium 25 and to the change of the pressure force effective in the respective solid body hydraulic medium 25, it is possible to achieve a closure of the gap between the front sides of piston 29 and the outer periphery of receiving element 25, or a corresponding increase in the pressing forces after piston 29 rests against receiving element 55.

Figure 6:
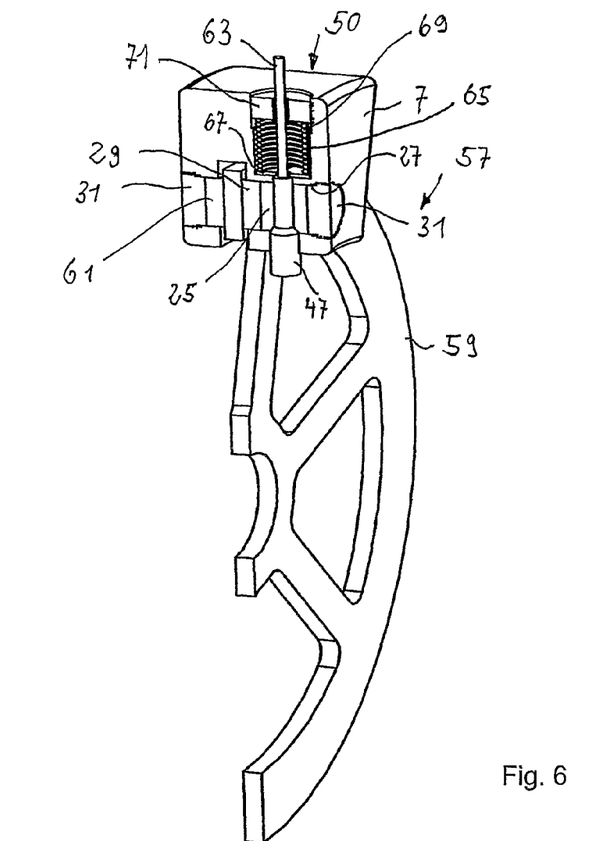
FIG. 6 is a perspective view of a disk brake with an additional embodiment of a clamping or braking device with a solid-body hydraulic medium.

FIG. 6 shows a disc brake 57 that comprises a brake disc 59 and a clamping or braking device 50. Braking device 50 has a housing 7 in which, similarly to the embodiment according to FIGS. 4a and 4b and FIGS. 5a and 5b, a solid-body hydraulic medium 25 and a closure element 31 as well as a piston 29 acting as the impinging element for brake disc 59 are accommodated in a cylindrical recess 27. Piston 29 can be constructed in the case of the disc brake shown in FIG. 6 as a brake pad, and can consist of material suitable for this purpose. On the side opposite piston 29, an additional brake pad 61, which can be connected to a closure element 31 that can be screwed into housing 7, is held in a corresponding cylindrical recess in housing 7. Piston 29 is preferably connected to solid-body hydraulic medium 25.

In the embodiment of a clamping or braking device 50 illustrated in FIG. 6, solid-body hydraulic medium 25 is penetrated by a pin-shaped actuating element 47, which is constructed analogously to the embodiment according to FIGS. 4a and 4b. The end of actuating element 47 having a smaller cross section, which penetrates through solid-body hydraulic medium 25, is connected to a pull cable 63.

The pull cable is led to a cylindrical hole 65 in housing 7, into which the end of actuating element 47 having a smaller cross section projects. A disc 67 having a cylindrical hole through which pull cable 63 is run is provided at the bottom of cylindrical hole 65. With its lower end face, disc 67 serves as a stop for the end face of actuating element 47, and with its upper end face, it serves as a stop for a helical spring 69 provided in hole 65. The upper end of helical spring 69 acts on a closure element 71 that can be screwed into recess 65 and has a central hole through which pull cable 63 is run.

In this manner, actuating element 47 can be moved with its posterior area having a larger cross section into solid-body hydraulic medium 25 by the application of a tensile force by means of pull cable 63. This results, in the manner described above, in a movement of piston 29 in the direction toward brake disc 59, and after contact of piston 29 with brake disc 59, in a corresponding braking force. An automatic resetting of actuating element 47 is achieved by disc 67 and helical spring 69 if the tensile force acting on pull cable 63 is less than the force exerted by helical spring 69 on disc 67.

In place of the stationary brake shoe 61, a second clamping or braking device 50 can of course also be provided in housing 7 on this side of brake disc 59. The two pull cables can be connected to one another and the actual pull cable can engage with this connecting cable. In place of a connecting cable, a rigid connecting element can of course also be provided in this case.

In comparison to conventional disc brakes, this disc brake has the advantage of an extremely simple and compact structure, with no force deflections, lever mechanisms, crank guides or the like being necessary. In comparison to brakes using only hydraulic oil, such a disc brake has the advantage that, because of the use of the solid-body hydraulic medium, no sealing problems can appear.

Finally it may be noted that, to the extent it is reasonable, individual characteristics which were described above in connection with a given embodiment can also be analogously combined with other embodiments.

Finally it may be noted that the actuating element can in principle be driven by any suitable drive mechanism, for example by an electromagnetic drive mechanisms such as a solenoid actuator that is coupled to the actuating element or an element connected thereto.

The actuating element can also be under an initial tension by means, for instance, of a springy element which acts on the actuating element in its rest position in such a manner that the clamping or braking device clamps or brakes the respective element.

The drive can then be constructed such that, when it is activated, the actuating element is moved in such a manner that the braking or clamping forces exerted on the respective element are reduced or completely canceled by the induced change in the shape of the volume of the solid-body hydraulic medium.

Figure 7:
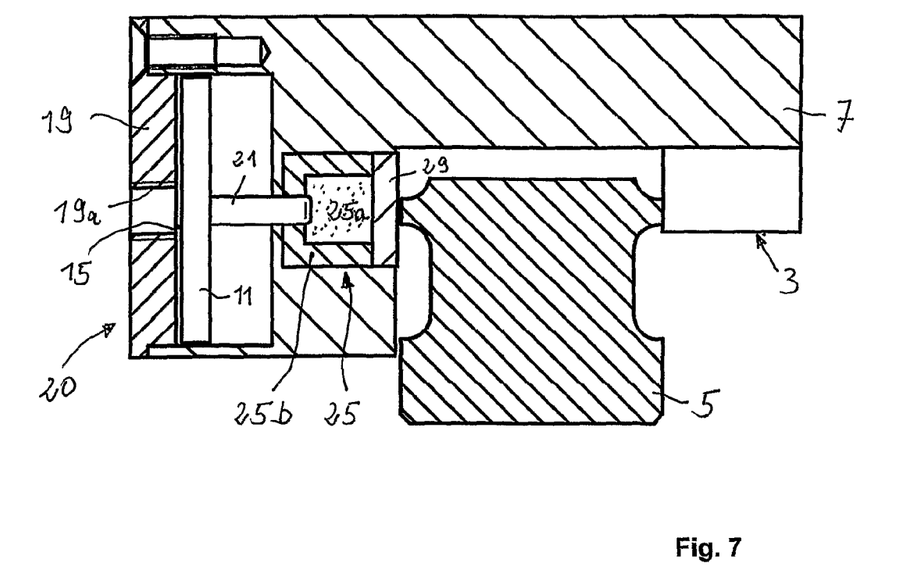
FIG. 7 is a cross section of an embodiment of a clamping or braking device similar to FIGS. 3a and 3b, but with an actuating element that cooperates with a hydraulic medium that consists of a combination of a solid-body hydraulic medium with a liquid or pasty hydraulic medium.

FIG. 7 shows an embodiment of a clamping or braking device similar to that illustrated in FIGS. 3a and 3b. Identical or functionally identical elements are therefore labeled with identical reference numbers so that in this regard reference can be made to the description of FIGS. 3a and 3b above.

The essential difference in FIG. 7 is that hydraulic medium 25 has two different components, namely a solid-body hydraulic medium 25b and a secondary hydraulic medium 25a enclosed therein, which can be configured as a liquid or pasty hydraulic medium or constructed of a solid-body hydraulic medium having a lower Shore hardness than solid-body hydraulic medium 25a, wherein the Shore hardness should be selected such that the medium allows sufficient material movements or shifts, particularly in the vicinity of spike-shaped actuating element 21, without destruction of the material occurring even with frequent actuation.

In the illustrated embodiment, hydraulic medium 25b has a pot-like shape, wherein the end faces of the annular wall are connected to the impinging element by means of adhesive bonding or vulcanizing, for example. Secondary hydraulic medium 25a is thus delimited by impinging element 29 and the inner wall of solid-body hydraulic medium 25b.

Actuating element 21 reaches through solid-body hydraulic medium 25b in an aperture and plunges into secondary hydraulic medium 25a. The pressure or the respective increased pressure due to the plunging action is transferred by secondary hydraulic medium 25a to the impinging element and solid-body hydraulic medium 25b, which thereby likewise experiences a change in shape and likewise transmits this pressure via the end face of the annular wall. The increased pressure acts simultaneously on actuating element 29 via the inside surface of the aperture in solid-body hydraulic medium 25b, whereby an improved sealing effect results.

Since the greatest material movements or shifting in a hydraulic medium 25 configured in this way take place in secondary hydraulic medium 25a, a destruction of the material in the solid-body hydraulic medium is avoided and therefore the service life is improved.

Figure 8:
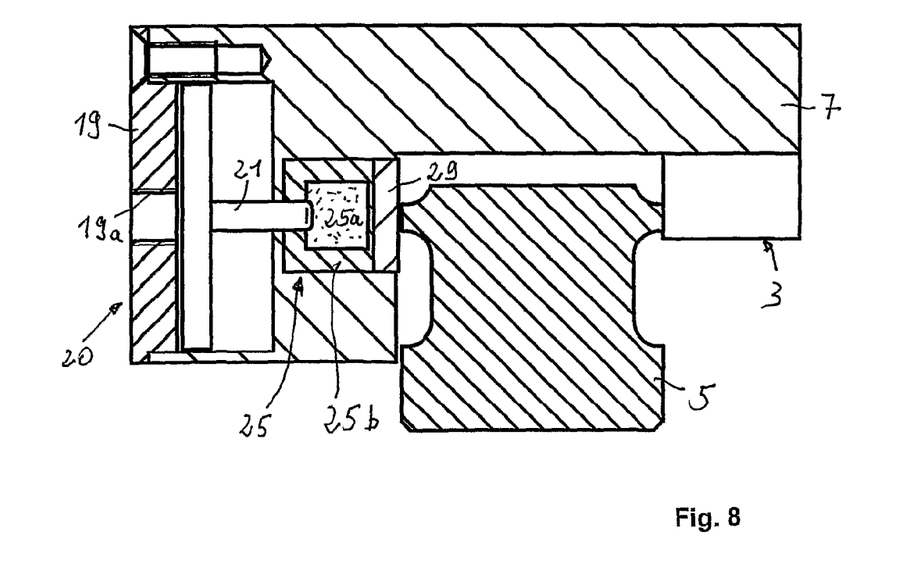
FIG. 8 is a cross section of an embodiment of a clamping or braking device similar to FIG. 7, wherein the solid-body hydraulic medium encloses the liquid or pasty hydraulic medium apart from the penetration area for the actuating element.

FIG. 8 shows a very similar embodiment, wherein the solid-body hydraulic medium 25b in this case is likewise closed at its bottom, i.e., in the area adjacent to impinging element 29. Thereby hydraulic medium 25 can be realized as a stand-alone component. Of course, hydraulic medium 25 can be connected to impinging element 29 in this case as well.

Figure 9:
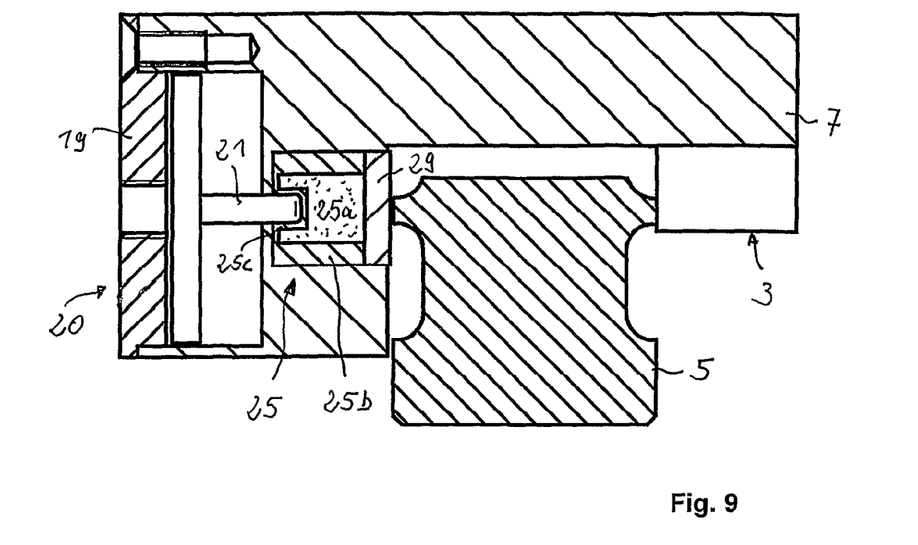
FIG. 9 is a cross section of an embodiment of a clamping or braking device similar to FIG. 7, wherein the actuating element acts upon a membrane area of the solid-body hydraulic medium.
Figure 10:
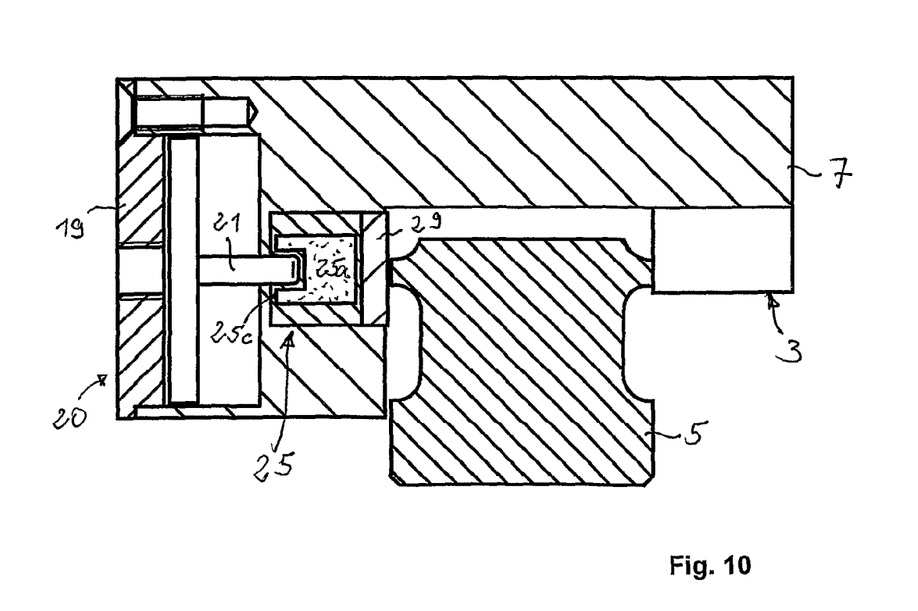
FIG. 10 is a cross section of an embodiment of a clamping or braking device similar to FIG. 8, wherein the actuating element acts upon a membrane area of the solid-body hydraulic medium.

The embodiments illustrated in FIGS. 9 and 10 differ from the embodiments illustrated in FIGS. 7 and 8 in that hydraulic medium 25 has no opening for actuating element 21. In the variants shown in FIGS. 9 and 10, this element acts on a membrane 25c which is constructed as a part of solid-body hydraulic medium 25b. In that way, sealing problems between actuating element 21 and hydraulic medium 25 are completely eliminated. The clamping or braking devices 20 according to FIGS. 9 and 10 otherwise correspond to the embodiments according to FIGS. 7 and 8, particularly as regards the configuration of hydraulic medium 25, so that one can refer to the respective descriptions in this regard.

As used herein, the terms "comprising," "including," "having," and the like are to be understood to be open-ended, that is, to mean including but not limited to.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A pneumatically actuatable clamping or braking device, comprising:
   (a) a housing with a space accommodating a hydraulic medium, the hydraulic medium comprising a solid body surrounding a secondary hydraulic medium, the solid body comprising a deformable body that is substantially incompressible under deformation and that displays a substantially uniform pressure distribution inside its volume and on surfaces delimiting its volume, the secondary hydraulic medium consisting of a liquid, a paste, or a solid having a Shore hardness less than that of the solid body, the space accommodating the hydraulic medium being delimited on one side by a wall of the housing and on another side by a clamping or braking element; and
   (b) an actuating element that is adapted to act on the hydraulic medium to produce a clamping or braking force which can be transmitted by the clamping or braking element to an impinging element, wherein:
      (i) the actuating element is shaped like a pin or a spike;
      (ii) the actuating element is adapted to be movable along a predetermined spatial path; and
      (iii) the actuating element is adapted to act on the hydraulic medium through an aperture in the wall of the housing delimiting the space for accommodating the hydraulic medium.

2. The clamping or braking device of claim 1, wherein the solid body is an elastic solid body.

3. The clamping or braking device of claim 2, wherein the elastic solid body is an elastomer.

4. The clamping or braking device of claim 1, wherein the impinging element is integrated into the housing or is detachably connected thereto, and wherein the impinging element has an elastically flexible area which is acted upon by the hydraulic medium.

5. The clamping or braking device of claim 1, wherein the solid body has an opening through which the actuating element is actuated in a manner that strengthens a seal between the actuating element and the solid body.

6. The clamping or braking device of claim 1, wherein the solid body has a membrane area that is deformed by the actuating element, the membrane area being elastically constructed in such a manner that a predetermined movement path of the actuating element is made possible.

7. The clamping or braking device of claim 1, wherein the solid body has a wall area that delimits the area in which the secondary solid body is enclosed, and exerts pressure on the impinging element with the surface facing away from the area in which the secondary solid body is enclosed.

8. The clamping or braking device of claim 1, wherein the solid body has an annularly closed wall area that delimits the area in which the secondary solid body is enclosed, and is connected by its annular end face to the impinging element.

9. The clamping or braking device of claim 1, further including a pneumatic cylinder that is adapted to act on the actuating element.

10. The clamping or braking device of claim 1, wherein the solid body of the hydraulic medium includes a membrane area, and the actuating element acts upon the membrane area to produce a clamping or braking force.

* * * * *